US012348933B2

(12) United States Patent
von Brasch et al.

(10) Patent No.: US 12,348,933 B2
(45) **Date of Patent: *Jul. 1, 2025**

(54) AUDIO TRAINING

(71) Applicant: Cochlear Limited, Macquarie University (AU)

(72) Inventors: Alexander von Brasch, Cremorne (AU); Stephen Fung, Dundas Valley (AU); Kartik Natarajan, Northwood (AU)

(73) Assignee: Cochlear Limited, Macquarie University (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,575

(22) Filed: Dec. 8, 2023

(65) Prior Publication Data

US 2024/0179479 A1 May 30, 2024

Related U.S. Application Data

(63) Continuation of application No. 17/625,017, filed as application No. PCT/IB2020/056705 on Jul. 16, 2020, now Pat. No. 11,877,123.

(Continued)

(51) Int. Cl.
*H04R 25/00* (2006.01)

(52) U.S. Cl.
CPC ......... *H04R 25/507* (2013.01); *H04R 25/552* (2013.01); *H04R 25/554* (2013.01);
(Continued)

(58) Field of Classification Search
CPC .. H04R 25/507; H04R 25/552; H04R 25/554; H04R 25/70; H04R 2225/39;
(Continued)

(56) References Cited

U.S. PATENT DOCUMENTS 8,379,871 B2 * 2/2013 Michael ................. H04R 25/50 381/314
9,114,259 B2 8/2015 Chambers et al.
(Continued)

FOREIGN PATENT DOCUMENTS

CN 1530892 A 9/2004
CN 109166369 A 1/2019
(Continued)

OTHER PUBLICATIONS

Han et al. KR 20150074642A Method and Apparatus for Outputting Information Related to External Sound Signals which are Input to Sound Output Device (Year: 2013).*
(Continued)

*Primary Examiner* — Brian Ensey
(74) *Attorney, Agent, or Firm* — Edell, Shapiro & Finann, LLC

(57) ABSTRACT

Presented herein are audio training techniques that facilitate the rehabilitation of a recipient of an auditory prosthesis. In certain embodiments, the audio training techniques presented herein may include real time training aspects in which the recipient's surrounding (ambient) auditory environment, including the sounds present therein, is analyzed in real time. The recipient can then be provided with a real time identity (e.g., audible or visible representation/description) of the sounds present in the auditory environment. The identity of the sounds can be provided to the recipient automatically and/or in response to recipient queries.

22 Claims, 7 Drawing Sheets

Related U.S. Application Data

(60) Provisional application No. 62/876,825, filed on Jul. 22, 2019.

(52) U.S. Cl.
CPC ......... *H04R 25/70* (2013.01); *H04R 2225/39* (2013.01); *H04R 2225/41* (2013.01); *H04R 2225/55* (2013.01)

(58) Field of Classification Search
CPC ............ H04R 2225/41; H04R 2225/55; H04R 2225/67; H04R 25/43; H04R 25/50
See application file for complete search history.

(56) References Cited

U.S. PATENT DOCUMENTS

| | | | |
|---|---|---|---|
| 9,549,264 B2 | 1/2017 | Kim et al. | |
| 9,706,316 B2 | 7/2017 | Stiefenhofer | |
| 10,129,664 B2 | 11/2018 | Fitz et al. | |
| 10,154,354 B2 | 12/2018 | Fung et al. | |
| 2009/0279723 A1* | 11/2009 | Segel | H04R 25/70 381/312 |
| 2011/0280409 A1 | 11/2011 | Michael et al. | |
| 2014/0180362 A1 | 6/2014 | Chambers et al. | |
| 2017/0360364 A1 | 12/2017 | Heasman et al. | |

FOREIGN PATENT DOCUMENTS

| | | |
|---|---|---|
| JP | 2014-158151 A | 8/2014 |
| JP | 2017-147504 A | 8/2017 |
| KR | 10-2015-0074642 A | 7/2015 |

OTHER PUBLICATIONS

International Search Report and Written Opinion in counterpart International Application No. PCT/IB2020/056705, mailed Oct. 23, 2020, 9 pages.

Bountourakis et al., “Machine Learning Algorithms for Environmental Sound Recognition: Towards Soundscape Semantics”, DOI: 10.1145/2814895.2814905, Oct. 2015, 8 pages.

Han, Soon Seob, “Method and apparatus for outputting information related to external sound signals which are input to sound output device”, Translation of KR-10-2015-0074642, 2015, 38 pages.

* cited by examiner

AUDIO TRAINING

BACKGROUND

Field of the Invention

The present invention relates generally to audio training in auditory prosthesis systems.

Related Art

Hearing loss is a type of sensory impairment that is generally of two types, namely conductive and/or sensorineural. Conductive hearing loss occurs when the normal mechanical pathways of the outer and/or middle ear are impeded, for example, by damage to the ossicular chain or ear canal. Sensorineural hearing loss occurs when there is damage to the inner ear, or to the nerve pathways from the inner ear to the brain.

Individuals who suffer from conductive hearing loss typically have some form of residual hearing because the hair cells in the cochlea are undamaged. As such, individuals suffering from conductive hearing loss typically receive an auditory prosthesis that generates motion of the cochlea fluid. Such auditory prostheses include, for example, acoustic hearing aids, bone conduction devices, and direct acoustic stimulators.

In many people who are profoundly deaf, however, the reason for their deafness is sensorineural hearing loss. Those suffering from some forms of sensorineural hearing loss are unable to derive suitable benefit from auditory prostheses that generate mechanical motion of the cochlea fluid. Such individuals can benefit from implantable auditory prostheses that stimulate nerve cells of the recipient's auditory system in other ways (e.g., electrical, optical and the like). Cochlear implants are often proposed when the sensorineural hearing loss is due to the absence or destruction of the cochlea hair cells, which transduce acoustic signals into nerve impulses. An auditory brainstem stimulator is another type of stimulating auditory prosthesis that might also be proposed when a recipient experiences sensorineural hearing loss due to damage to the auditory nerve.

SUMMARY

In one aspect, a method is provided. The method comprises: recording segments of sound signals received at an auditory prosthesis system, wherein the auditory prosthesis system comprises an auditory prosthesis configured to be at least partially implanted in a recipient; detecting one or more sound identification trigger conditions associated with at least one of the segments of sound signals; determining an identity of one or more sounds present in the at least one of the segments of sound signals; and providing the identity of the one or more sounds present in the at least one of the segments of sound signals to the recipient of the auditory prosthesis.

In another aspect, a method is provided. The method comprises: receiving sounds via at least one or more sound inputs of an auditory prosthesis; generating, based on one or more of the sounds, stimulation signals for delivery to the recipient to evoke perception of the one or more sounds; determining sound identity information associated with the one or more sounds; and providing the recipient with at least one of an audible or visible descriptor of the sound identity information.

In another aspect, a system is provided. The system comprises: one or more microphones configured to receive sounds; one or more memory devices configured to store instructions for an audio training program; and one or more processors configured to execute the instructions for the audio training program to: determine sound identity information associated with the one or more sounds; and provide the recipient with at least one of an audible or visible representation of the sound identity information.

BRIEF DESCRIPTION OF THE DRAWINGS

Embodiments of the present invention are described herein in conjunction with the accompanying drawings, in which.

DETAILED DESCRIPTION

Figure 1:
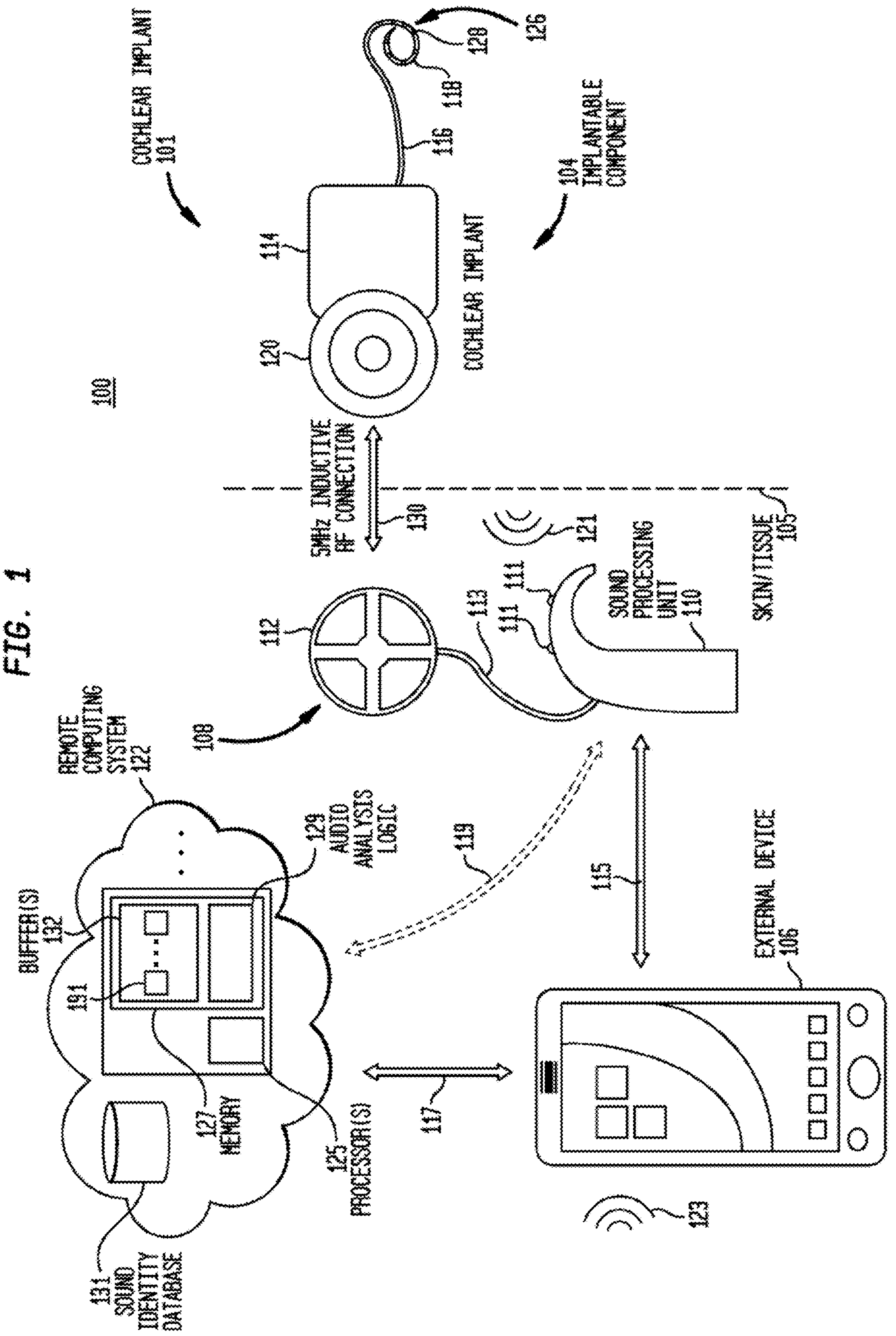
FIG. 1 is a schematic diagram illustrating a cochlear implant system in accordance with embodiments presented herein.

In a fully functional human ear, the outer ear (auricle) collects sound signals/waves which are channeled into and through the ear canal. Disposed across the distal end of ear canal is the tympanic membrane (ear drum) which vibrates in response to the sound waves. This vibration is coupled to an opening in the cochlea, known as the oval window, through bones of the middle ear. The bones of the middle ear serve to filter and amplify the sound waves, which in turn cause the oval window to articulate (vibrate) (e.g., the oval window vibrates in response to vibration of the tympanic membrane). This vibration of the oval window sets up waves of fluid motion of the perilymph within the cochlea. Such fluid motion, in turn, activates thousands of tiny hair cells inside of cochlea. Activation of the hair cells causes the generation of appropriate nerve impulses, which are transferred through the spiral ganglion cells and auditory nerve to the brain where they are perceived as sound.

As noted above, sensorineural hearing loss may be due to the absence or destruction of the hair cells in the cochlea. Therefore, individuals with this type of sensorineural hearing loss are often implanted with a cochlear implant or another electrically-stimulating auditory/hearing prosthesis (e.g., electroacoustic hearing prosthesis, etc.) that operates by converting at least a portion of received sound signals into electrical stimulation signals (current signals) for delivery to a recipient's auditory system, thereby bypassing the missing or damaged hair cells of the cochlea.

Due to the use of electrical stimulation and the bypassing of the hair cells in the cochlea (referred to herein as "electrical hearing" or an "electrical pathway"), new recipients of electrically-stimulating auditory prostheses often have difficulty understanding certain (possibly many) sounds. For a recipient that had hearing capabilities before implantation, in particular, sounds that they previously perceived and interpreted as common place (e.g., a coffee machine, a bubbling brook, the bark of a dog, etc.), can be misunderstood and confusing when first heard through the electrical pathway.

As a result of the difficulties associated with electrical hearing, electrically-stimulating auditory prosthesis recipients typically undergo extensive habilitation (e.g., intervention for recipients who have never heard before) or rehabilitation (e.g., intervention for recipients who are learning to hear again). For ease of description, "habilitation" and "rehabilitation" are collectively and generally referred to herein as "rehabilitation," which, again as used herein, refers to a process during which a recipient learns to properly understand/perceive sounds signals (sounds) heard via his/her auditory prosthesis.

In conventional arrangements, rehabilitation often occurs within a clinical environment using complex equipment and techniques implemented by trained audiologists/clinicians. However, recipients often do not visit clinics on a regular basis due to, for example, costs, lack of insurance coverage, low availability of trained audiologists, such as in rural areas, etc. Therefore, the need to visit a clinic for all rehabilitation activities may not only be cost prohibitive for certain recipients, but may also require the recipient to live with improper sound perceptions (possibly unknowingly) for significant periods of time.

Accordingly, presented herein are audio training techniques that facilitate the rehabilitation of a recipient of an auditory prosthesis. In certain embodiments, the audio training techniques presented herein may include real time training aspects in which the recipient's surrounding (ambient) auditory environment, including the sounds present therein, is analyzed in real time. The recipient can then be provided with a real time identity (e.g., audible or visible representation/description) of the sounds present in the auditory environment. The identity of the sounds can be provided to the recipient automatically and/or in response to recipient queries. In further embodiments, the audio training techniques presented herein may include non-real time training aspects in which the identities of sounds present in the recipient's auditory environment, along with additional information (e.g., the sounds, sound characteristics, etc.), are logged and used for offline rehabilitation exercises.

Merely for ease of description, the techniques presented herein are primarily described with reference to one illustrative auditory prosthesis, namely a cochlear implant. However, it is to be appreciated that the techniques presented herein may also be used with a variety of other types of auditory prostheses, such as electro-acoustic hearing prostheses, auditory brainstem implants, bimodal auditory prostheses, bilateral auditory prostheses, acoustic hearing aids, bone conduction devices, middle ear auditory prostheses, direct acoustic stimulators, etc. As such, description of the invention with reference to a cochlear implant should not be interpreted as a limitation of the scope of the techniques presented herein.

FIG. 1 is a schematic diagram of an exemplary cochlear implant system 100 configured to implement aspects of the present invention. As shown, the cochlear implant system 100 includes a cochlear implant 101 that comprises an external component 108 configured to be attached to a recipient, and an implantable component 104 configured to be implanted under the skin/tissue 105 of the recipient. The cochlear implant system 100 also includes an electronic device 106, which is referred to simply herein as external device 106, and a remote computing system 122.

In this example, the external component 108 comprises a behind-the-ear (BTE) sound processing unit 110, such as a mini or micro-BTE, and an external coil 112. However, it is to be appreciated that this arrangement is merely illustrate and that embodiments presented herein may be implemented with other external component arrangements. For example, in one alternative embodiment, the external component 108 may comprise an off-the-ear (OTE) sound processing unit in which the external coil, microphones, and other elements are integrated into a single housing/unit configured to be worn on the head of the recipient.

In the example of FIG. 1, the sound processing unit 110 comprises a plurality of sound input elements/devices 111 (e.g., microphones, telecoils, etc.) for receiving sound signals 121. The sound input element(s) 111 are configured to convert the received sound signals 121 into electrical signals (not shown in FIG. 1). As described below, the sound processing unit 110 includes components configured to convert the electrical signals generated by the sound input element(s) 111 into control signals (not shown in FIG. 1) that are useable by implantable component 104 to stimulate the recipient in a manner that attempts to evoke perception of the sound signals 121.

As shown in FIG. 1, the sound processing unit 110 is electrically connected to the external coil 112 via a cable or lead 113. The external coil 112 is an external radio frequency (RF) coil. Generally, a magnet (also not shown in FIG. 1) may be fixed relative to the external coil. Further details of the sound processing unit 110 are provided below with reference to FIG. 3.

Figure 2:
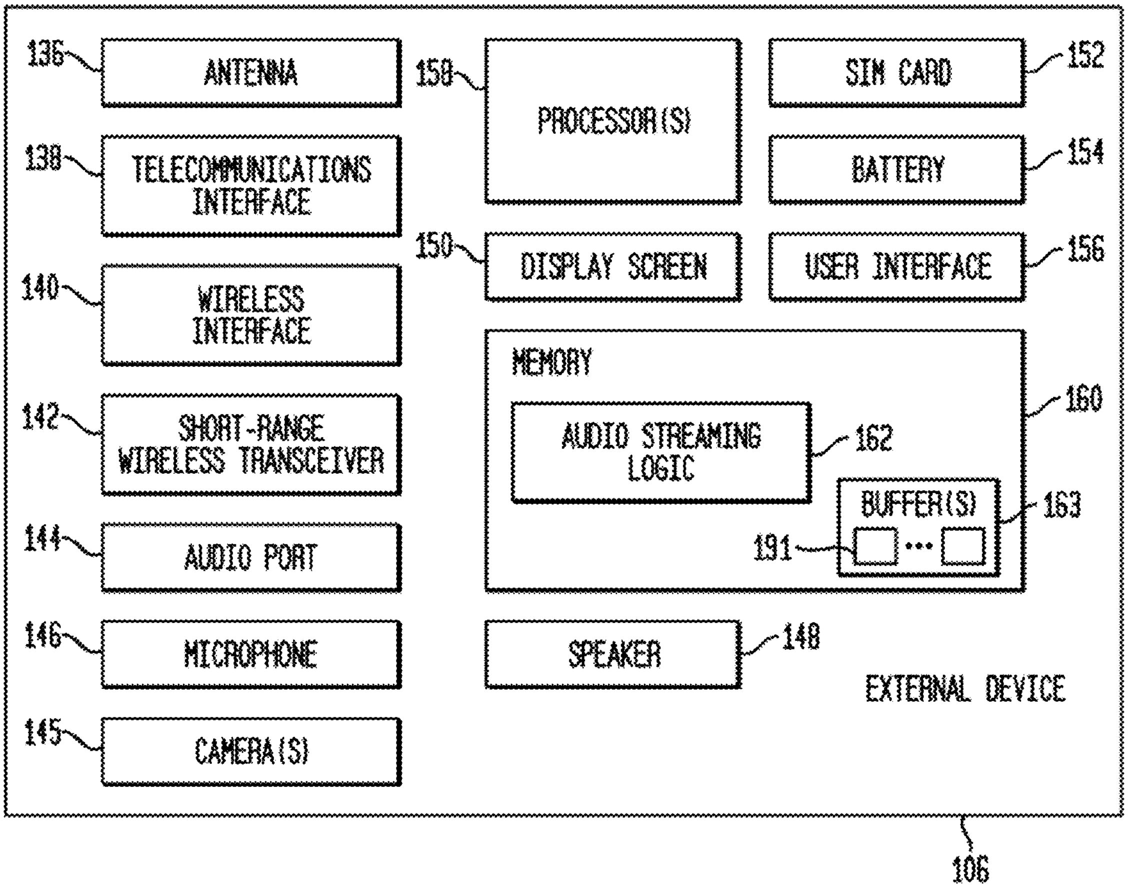
FIG. 2 is a block diagram of an external device operating with a cochlear implant system in accordance with embodiments presented herein.

As noted, the cochlear implant system 100 includes an external device 106, further details of which are shown in FIG. 2. As described further below, the external device 106 and the sound processing unit 110 each include a short-range wireless transceiver configured for wireless communication in accordance with a short-range wireless standard (i.e., over a short-range wireless link/connection). In certain embodiments, the short-range wireless transceivers are Bluetooth® transceivers that communicate using short-wavelength Ultra High Frequency (UHF) radio waves in the industrial, scientific and medical (ISM) band from 2.4 to 2.485 gigahertz (GHz). Bluetooth® is a registered trademark owned by the Bluetooth® SIG. As such, the external device 106 and the sound processing unit 110 can communicate over a short-range wireless link/channel 115.

The cochlear implant 104 comprises an implant body 114, a lead region 116, and an elongate intra-cochlear stimulating assembly 118. Elongate stimulating assembly 118 is configured to be at least partially implanted in the cochlea of a recipient and includes a plurality of intra-cochlear stimulating contacts 128. The stimulating contacts 128 collectively form a contact array 126 and may comprise electrical contacts and/or optical contacts. Stimulating assembly 118 extends through an opening in the cochlea (e.g., cochleostomy, the round window, etc.) and has a proximal end connected to the stimulator unit in implant body 114 via lead region 116 that extends through the recipient's mastoid bone.

Cochlear implant 104 also comprises an internal RF coil 120, a magnet fixed relative to the internal coil, a stimulator unit, and a closely coupled wireless transceiver positioned in the implant body 114. The magnets adjacent to external coil 112 and in the cochlear implant 104 facilitate the operational alignment of the external coil 112 with the internal coil 120 in the implant body. The operational alignment of the coils 112 and 120 enables the internal coil 120 to transcutaneously receive power and data (e.g., the control signals generated based on the sound signals 121) from the external coil 112 over the closely-coupled RF link 130. The external and internal coils 112 and 120 are typically wire antenna coils.

As noted above, FIG. 1 also illustrates a remote computing system 122. In the specific example of FIG. 1, the remote computing system 122 is a cloud-based software platform (cloud) that comprises one or more servers 124 and one or more database systems (databases) 131.

In the example of FIG. 1, the one or more servers comprise one or more processors 125 and a memory device (memory) 127, which includes audio analysis logic 129. Further details regarding the audio analysis logic 129 are provided below. Memory device 127 may comprise any one or more of read only memory (ROM), random access memory (RAM), magnetic disk storage media devices, optical storage media devices, flash memory devices, electrical, optical, or other physical/tangible memory storage devices. The one or more processors 125 are, for example, microprocessors or microcontrollers that execute instructions for the audio analysis logic 129 stored in memory device 127.

In the example of FIG. 1, the external device 106 is a mobile electronic device such as, for example, a remote control device (remote control), a smartphone, a voice assistant device, etc. As noted, the external device 106 has the ability to communicate with the sound processing unit 110 via short-range wireless link 115. Additionally, the external component 106 has the ability to communicate with remote computing system 122 via one or more network links/connections 117 (e.g., a telecommunications network, a wireless local area network, a wide area network, etc.). It is to be appreciated that the remote computing system 122 would include one or more additional components/devices to enable such network connectively. Such components are well known in the art and, for ease of illustration, have been omitted from FIG. 1.

FIG. 2 is a block diagram of an arrangement in which the external device 106 is a smartphone. It is to be appreciated that FIG. 2 is merely illustrative and that, as noted above, external device 106 is not limited to the example arrangement shown in FIG. 2 and, as such, the external device 106 may be any portable, handheld, and/or mobile device now know or later developed (e.g., phone, watch or other wearable device, etc.).

As shown, external device 106 first comprises an antenna 136 and a telecommunications interface 138 that are configured for communication on a telecommunications network. The telecommunications network over which the radio antenna 136 and the radio interface 138 communicate may be, for example, a Global System for Mobile Communications (GSM) network, code division multiple access (CDMA) network, time division multiple access (TDMA), or other kinds of networks.

External device 106 also includes a wireless local area network interface 140 and a short-range wireless interface/transceiver 142 (e.g., an infrared (IR) or Bluetooth® transceiver). Bluetooth® is a registered trademark owned by the Bluetooth® SIG. The wireless local area network interface 140 allows the external device 106 to connect to the Internet, while the short-range wireless transceiver 142 enables the external device 106 to wirelessly communicate (i.e., directly receive and transmit data to/from another device via a wireless connection), such as over a 2.4 Gigahertz (GHz) link. As described further below, the short-range wireless transceiver 142 is used to wirelessly connect the external device 106 to sound processing unit 110. It is to be appreciated that that any other interfaces now known or later developed including, but not limited to, Institute of Electrical and Electronics Engineers (IEEE) 802.11, IEEE 802.16 (WiMAX), fixed line, Long Term Evolution (LTE), etc., may also or alternatively form part of the external device 106.

In the example of FIG. 2, external device 106 comprises an audio port 144, one or more cameras 145, one or more sound input elements, such as a microphone 146, a speaker 148, a display screen 150, a subscriber identity module or subscriber identification module (SIM) card 152, a battery 154, a user interface 156, one or more processors 158, and a memory device 160. Stored in memory device 160 is audio streaming logic 162 and one or more buffers 163. Further details regarding the audio streaming logic 162 are provided below.

The display screen 150 is an output device, such as a liquid crystal display (LCD), for presentation of visual information to the cochlear implant recipient. The user interface 156 may take many different forms and may include, for example, a keypad, keyboard, mouse, touchscreen, etc. In certain examples, the display screen 150 and user interface 156 may be integrated with one another (e.g., in a touchscreen arrangement in which an input device is layered on the top of an electronic visual display).

Memory device 160 may comprise any one or more of ROM, RAM, magnetic disk storage media devices, optical storage media devices, flash memory devices, electrical, optical, or other physical/tangible memory storage devices. The one or more processors 158 are, for example, microprocessors or microcontrollers that execute instructions for the audio streaming application 162 stored in memory device 160.

Figure 3:
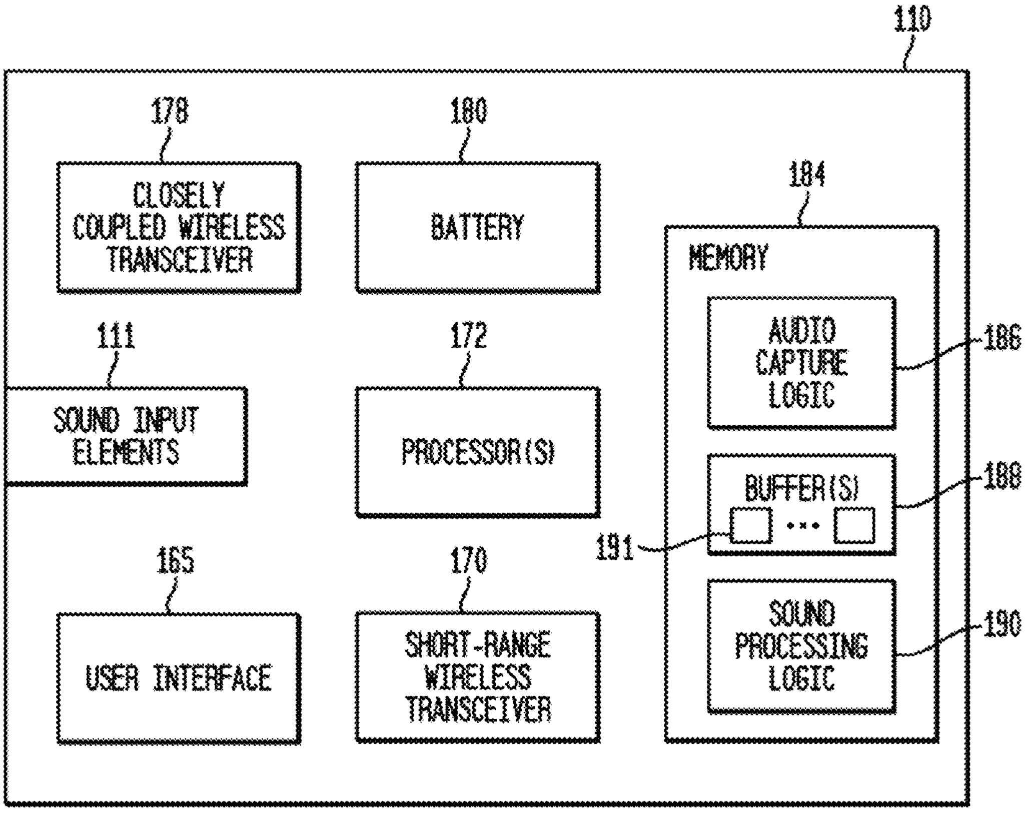
FIG. 3 is a block diagram of a sound processing unit of a cochlear implant system in accordance with embodiments presented herein.

FIG. 3 is a functional block diagram illustrating elements of sound processing unit 110 in accordance with an example embodiment. Shown in FIG. 3 is a short-range wireless transceiver 170, a closely coupled wireless transceiver (i.e., RF encoder/coil driver) 178 that is connected to the RF coil 112 (FIG. 1), a user interface 165 that includes at least one user input device (e.g., push button) and, optionally a display (e.g., numerical display), one or more processors 172, one or more sound input elements/devices 111 (e.g., microphones telecoils, audio input port, Universal Serial Bus (USB) port, etc., and a rechargeable battery 180, such as an integrated or removable lithium-ion (LiIon) battery. Sound processing unit 110 also includes a memory device 184 that stores audio capture logic 186, one or more buffers 188, and sound processing logic 190. Further details regarding the audio capture logic 186 and the sound processing logic 190 are provided below.

The closely coupled wireless transceiver 178 is configured to transcutaneously transmit power and/or data to, and/or receive data from, cochlear implant 104 via the closely coupled RF link 130 (FIG. 1). As used herein, closely coupled wireless communication refers to communications that require close proximity between the communicating transceivers. Although FIGS. 1 and 3 illustrate the use of an RF link, it is to be appreciated that alternative embodiments may use other types of closely coupled links (e.g., infrared (IR), capacitive, etc.).

Memory device 184 may comprise any one or more of ROM, RAM, magnetic disk storage media devices, optical storage media devices, flash memory devices, electrical, optical, or other physical/tangible memory storage devices. The one or more processors 172 may be one or more microprocessors or microcontrollers that executes instructions for the audio capture logic 186 and the sound processing logic 190 stored in memory device 160.

When executed, the sound processing logic 190 cause the processor 172 to convert sound signals received via, for example, the one or more sound input elements 111 into coded control signals that represent stimulation signals for delivery to the recipient to evoke perception of the sound signals. The control signals are sent/transmitted over the closely coupled RF link 130 to implantable component 104. As noted, the implantable component 104 is configured to use the control signals to generate stimulation signals (e.g., current signals) for delivery to the recipient's cochlea (not shown) via the contact array 126.

FIGS. 1, 2, and 3 generally illustrate a cochlear implant 101 that includes an external sound processing unit 110. It is to be appreciated that embodiments of the present invention may be also implemented in cochlear implant systems, or other hearing prostheses, that do not include external components. For examples, embodiments of the present invention may be implemented in a totally implantable cochlear implant, where all components of the cochlear implant are configured to be implanted under skin/tissue of the recipient. Because all components of such a cochlear implant are implantable, the cochlear implant is configured to operate, for at least a finite period of time, without the need of an external component. In such examples, described operations of the sound processing unit 110 would be performed by an implantable component that at least includes one or more processors, a memory device, and a wireless transceiver for direct or indirect communication with the external device 106.

As noted, the sound processing unit 110 includes audio capture logic 184, the external device 106 comprises audio streaming logic 162, and the remote computing system 122 includes audio analysis logic 129. Collectively, audio capture logic 184, audio streaming logic 162, and audio analysis logic 129 form an "audio training program" that, as described in greater detail below, can be used for rehabilitation of the recipient of cochlear implant 101. That is, audio capture logic 184, audio streaming logic 162, and audio analysis logic 129 are distributed logic/software components of a program that is configured to perform the techniques presented herein. Merely for ease of illustration, the following description makes reference to the audio training program, the audio capture logic 184, the audio streaming logic 162, and/or or the audio analysis logic 129 as performing various operations/functions. Additionally, the following description makes reference to the sound processing unit 110, external device 106, and/or the remote computing system 122 performing various operations. It is to be appreciated that such references refer to the one or more processors 172, 158, and 125 executing associated software instructions to perform the various operations.

Figure 4:
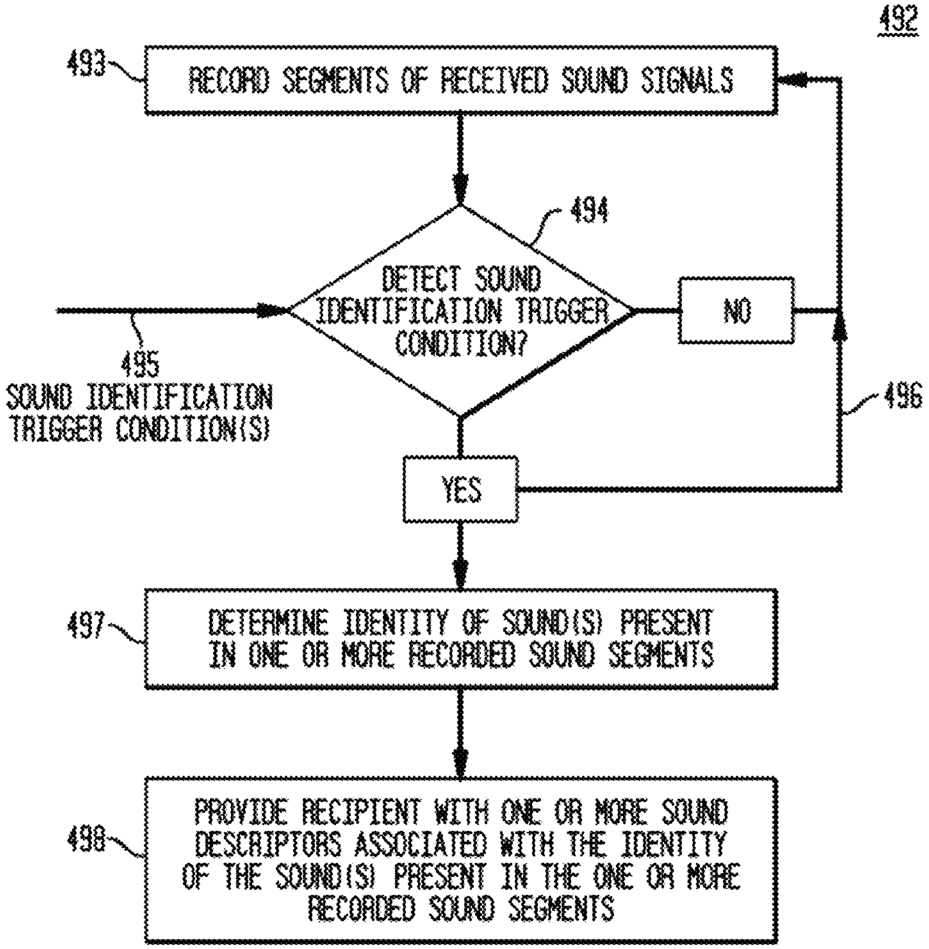
FIG. 4 is a flowchart of a method in accordance with embodiments presented herein.

In general, the audio training program is configured to monitor the recipient's ambient/surround auditory environment (i.e., the current or real-time sound environment experienced by the recipient) and to analyze the sounds present therein. Upon detection of certain sound identification trigger conditions, the audio training program is configured to identify the sounds present within the ambient auditory environment and to provide the recipient with an audible or visible descriptor of the sound identities. FIG. 4 is a flowchart illustrating a method 492 performed by an audio training program in accordance with embodiments presented herein. For ease of illustration, the method 492 of FIG. 4 will be described with reference to the arrangement shown in FIGS. 1-3.

More specifically, as noted above and as shown in FIG. 1, the sound processing unit 110 includes one or more sound input elements 111 configured to receive sound signals 121. As noted, these sound signals 121 are processed (e.g., using sound processing application 190) and converted to electrical stimulation signals for delivery to the recipient. However, as shown at 493 of FIG. 4, the audio capture logic 190 is configured to record the sound signals 121 (e.g., in the one or more buffers 188). In general, the audio capture logic 190 may record the sound signals 121 in discrete time segments (e.g., thirty second segments, one minute segments, etc.), sometimes referred to herein as "recorded sound segments" 191. In certain examples, the recorded sound segments 191 are then sent/transmitted to the external device 106 via the short-range coupled wireless channel 115.

The external device 106 is configured to temporarily store/save the recorded sound segments 191 (e.g., in the one or more buffers 163) received from sound processing unit 110. For example, the external device 106 may store recorded sound segments 191 received from the sound processing unit 110 within a previous time period (e.g., store recorded sound segments 191 received within the last one minute, received within last three minutes, received within last five minutes, etc.). At 494 of FIG. 4, the external device 106 (e.g., audio streaming logic 162) is configured to determine whether or not one or more "sound identification" trigger conditions 495 have been detected. As used herein, a sound identification trigger condition is a detectable event, condition, or action indicating that one or more sounds in one or more of the recorded sound segments 191 should be identified to the recipient.

As described further below, sound identification trigger conditions 495 in accordance with embodiments presented herein can take a number of different forms. In certain embodiments, the one or more sound identification trigger conditions 495 may comprise inputs received from the recipient (e.g., a touch input received via the user interface 156 of the external device 106, a verbal or voice input/command received from the recipient and detected at the sound inputs 111 of external processing 110 and/or detected at microphone 146 of the external device 106, etc.). In other embodiments, the one or more sound identification trigger conditions may comprise the detection of certain (e.g., predetermined) trigger sounds, such as predetermined trigger sounds that are known to confuse new recipients. These specific sound identification trigger conditions are illustrative and further details regarding potential sound identification trigger conditions are provided below.

Returning to FIG. 4, if, at 494, the audio streaming logic 162 determines that no sound identification trigger conditions 495 have been detected (e.g., within a predetermined time period, in relation to the recorded sound segments 191 received within a predetermined time period, etc.), then method 492 returns to 493 where the sound processing unit 110 continues to record sound signals and send recorded sound signal segments 191 to the external device 106.

However, if one or more sound identification trigger conditions 495 are detected by the external device 106, then the method 492 includes two branches. In particular, as shown by arrow 496, method 492 first returns to 493 where the sound processing unit 110 continues to record sound signals and send recorded sound signal segments 191 to the external device 106. However, while the sound processing unit 110 continues to record sound signals, the external device 106 sends at least one of the one or more recorded sound segments 191 stored at external device 106 to the remote computing system 122 via the network connections 117.

The remote computing system 122 is configured to at least temporarily store/save the recorded sound segments 191 (e.g., in the buffers 132). At 497, the remote computing system 122 (e.g., audio analysis logic 129) is configured to analyze the one or more recorded sound segments 191 to identify the sounds present in the recorded sound segments. In general, the audio analysis logic 129 includes or uses a type of decision structure (e.g., machine learning algorithm, decision tree, and/or other structures that operate based on individual extracted characteristics from the recorded sound signals) to "classify" the sounds present within the one or more recorded sound segments 191 into different categories. In general, the classification made by the audio analysis logic 129 generates a "sound identity classification" or, more simply, "sound identity" for the one or more sounds. As used herein, the "sound identity" of a sound is some form of description of the sound, rather than the sound itself. The sound identity (i.e., the sound description) may describe one or more of source of the sound (e.g., dog bark, cat meow, car horn, truck engine, etc.), content of the sound (e.g., content of the speech), a type or category of the sound (e.g., language spoke, type of motor, type of noise, type of accent, etc.), characteristics of the sound, the identity of a speaker, and/or other information allowing the recipient to differentiate the sound from other sounds, including speech and non-speech identity information. However, as described further below, the sound identity classification(s) made by the audio analysis logic 129 can take a number of different forms and can adapt/change over time.

As described further below, the audio analysis logic 129 may be executed in a number of different manners to classify the sounds present in the recorded sound segments 191 received from external device 106 (i.e., to generate a sound identity). However, in general, the audio analysis logic 129 is configured to extract sound features from the recorded sound segments 191 (i.e., from the sounds present therein). The extracted features may include, for example, (e.g., time information, signal levels, frequency, measures regarding the static and/or dynamic nature of the signals, timbre, harmonics, repeatability or the repeat pattern of a sound within a duration, etc. The audio analysis logic 129 is then configured to perform a multi-dimensional classification analysis of the features extracted from the recorded sound signal segment. As a result of these operations, the audio analysis logic 129 outputs "sound identity information," which includes at least the sound identity classifications for the one or more sounds present in the recorded sound segments 191. The sound identity information is then sent to the external device 106 via the network connections 117.

It is to be appreciated that the one or more recorded sound segments 191 classified by the audio analysis logic 129 can include multiple sounds that could be identified, possibly in the presence of background noise. When multiple sounds are present, the audio analysis logic 129 may be configured to identify all of the sounds or only a subset of the sounds. For example, the audio analysis logic 129 can be configured to correlate, in time, a recipient query (i.e., a sound identification trigger condition) with the timing at which sounds in the recorded sound segments 191 are delivered to the recipient. In such examples, audio analysis logic 129 could only identify sounds that are delivered to recipient substantially simultaneously/concurrently with, or within a predetermined time period before, detection of the recipient query.

As noted above, the one or more recorded sound segments 191 may include background noise. In certain embodiments, the audio analysis logic 129 may be configured to cancel the background noise before generating the sound identity classifications(s) (i.e., before analyzing the one or more recorded sound segments with the decision structure(s)). In other embodiments, the audio analysis logic 129 may be configured to identify that the one or more record sound segments 191 include background noise and/or to classify/identify the type of background noises.

As noted above, the audio analysis logic 129 is configured to generate the sound identity classifications(s) by analyzing features extracted from the record sound signals (e.g., analyzing sound features with the decision structure(s)). In accordance with certain embodiments, the audio analysis logic 129 may use "contextual data" to make the sound identity classifications. In certain examples, the contextual data, which may be part of the data sent to the remote computing system 122 by external device 106, may include geographic or location information (e.g., Global Positioning System (GPS) coordinates, Wi-Fi location information), image data (e.g., images captured by the one or more cameras 145 of the external device 106), etc. For example, the location information may indicate that the recipient is at a zoo, beach, etc., which in turn can be used by the audio analysis logic 129 (i.e., in the classification analysis) to improve (e.g., make more accurate) or to speed up the generation of the sound identity classifications. In another example, the audio analysis logic 129 may receive an image of one or more objects or persons in the recipient's auditory environment. In such examples, classification of the objects or persons in the image(s) may be used in making the sound identity classifications, thereby potentially improving the accuracy of the sound identity classifications.

Again returning to FIG. 4, at 498 the sound identity information (i.e., for the sounds present in the recorded sound segments 191 sent to the remote computing system 122) is provided to recipient. The sound identity information may be provided to the recipient in a number of different manners. In certain embodiments, the external device 106 (e.g., audio streaming logic 162) may be able to display the sound identity information to the recipient as a visible descriptor of the sound identity classification (e.g., text describing the sound, a picture/image describing the sound, etc.). In other embodiments, the external device 106 (e.g., audio streaming logic 162) may be configured to relay the sound identity information to the sound processing unit 110 in a form that enables the sound processing to render the sound identity information in as an audible (speech or spoken) descriptor (e.g., enable the sound processing unit 110 to generate electrical stimulation signals that allow the recipient to hear speech that describes the identity of the sounds).

In summary, FIG. 4 illustrates an example in which the audio training program records received sound signals. While the sound signals are recorded, the audio training program is configured to detect the occurrence of one or more sound identification trigger conditions. In response to detection of one or more sound identification trigger conditions, the audio training program analyzes the recorded sound signals to determine identity information for the sounds present therein. The identity information may then be provided to the recipient as a visible or audible (speech or spoken) descriptor. For example, when prompted by the recipient (i.e., a sound identification trigger condition), the audio training program can provide to the recipient a visible or audible descriptor of the sound(s) he/she just heard through the cochlear implant.

In the illustrative example of FIG. 4, the sound signals 121 are received/captured at the sound processing unit 110, recorded as sound segments, and then sent to the external device 106. In the same or other embodiments, sound signals 123 may also or alternatively be captured at the external device 106. In such embodiments, the sound signals 123 may be recorded into sound segments that can be correlated/associated with sound segments received from the sound processing unit 110 (if such recordings are made at the same time). The sound segments recorded at the external device 106 and the sound processing unit 110 can then be analyzed for generation of the sound identity information. Use of the sound signals 123 received at the external device 106 instead of, or in addition to, the sound signals 121 received at the sound processing unit 110 may be beneficial, for example, when the external device 106 is positioned relatively closer to the sound source, to provide increased directionality information, etc.

For ease of illustration, method 492 of FIG. 4 has been described above with reference to the cochlear implant system 100 of FIGS. 1-3 where the audio training program is distributed across several components, namely the sound processing unit 110, the external device 106, and the remote computing system 122. However, it is to be appreciated that this description is merely illustrative and that the method of FIG. 4, and more broadly various aspects presented herein, may be implemented in different systems/devices having different arrangements.

For example, in certain embodiments, the audio training program may be fully implemented at an auditory prosthesis, such as cochlear implant 101. In such embodiments, the auditory prosthesis is configured to: (1) capture and record sound signals, (2) detect the occurrence of one or more sound identification trigger conditions, (3) analyze the recorded sound signals to determine sound identity information for the sounds present therein, and (4) provide the sound identity information to the recipient. That is, in such embodiments, the auditory prosthesis integrates certain functionality of each of the audio capture logic 186, the audio streaming logic 162, and the audio analysis logic 129, as described above.

In other embodiments, the external device may be omitted and the audio training program may be implemented at an auditory prosthesis and a remote computing system. In such embodiments, the auditory prosthesis is configured to: (1) capture and record sound signals, (2) detect the occurrence of one or more sound identification trigger conditions, and (3) send recorded sound segments to the remote computing system. In these embodiments, the remote computing system is configured to analyze the recorded sound signals to determine sound identity information for the sounds present therein and then provide the sound identity information to the auditory prosthesis. The auditory prosthesis is then further configured to provide the sound identity information to the recipient. That is, in such embodiments, the auditory prosthesis integrates certain functionality of each of the audio capture logic 186 and the audio streaming logic 162, as described above, while the audio analysis logic 129 is implemented at the remote computing system.

Provided below are a few example use cases illustrating operation of an audio training program in accordance with certain techniques presented herein. Merely for ease of illustration, these examples will be described with reference to the example arrangement of FIGS. 1-3.

Figure 5:
FIG. 5 is a schematic diagram illustrating an audio training example, in accordance with certain embodiments presented herein.

In particular, in a first example shown in FIG. 5, a recipient of cochlear implant 101 takes a bushwalk/hike and becomes confused by one or more sounds she is hearing in the surrounding/ambient environment (i.e., the recipient's auditory environment). As such, the recipient issues a verbal query to the audio training program to identify the sounds in the surrounding environment. The verbal query may be, for example, "What is that sound?" or the like. The verbal query issued by the recipient causes the audio training program to identify the sounds present in the recipient's auditory environment and then provide the recipient with those sound identifications. The audio training program could then inform the recipient of the sounds she is hearing (e.g., "You are hearing a dog barking and a bird chirping.") In the example of FIG. 5, the sound identity information is provided as a visible descriptor (e.g., text) via display screen 150 of external device 106. However, in other embodiments, the sound identity information is provided in an audible form via cochlear implant 101.

In the example of FIG. 5, the verbal query issued by the recipient (e.g., "What is that sound?") is a sound identification trigger condition that may be detected by the sound processing unit 110 (e.g., via sound input elements 111 and audio capture logic 186) and/or by the external device 106 (e.g., via the microphone(s) 146 and audio streaming logic 162). Since, as detailed above, the sounds present in the recipient's auditory environment are recorded at the sound processing unit 110 and then provided to the external device 106, the detection of the verbal query (either directly by the external device 106 or based on a notification provided by the sound processing unit 110) causes the external device 106 to send one or more recorded sound segments to the remote computing system 122. The remote computing system 122 analyzes the recorded sound segments to identify the sounds present in the recipient's auditory environment. The external device 106 and/or the sound processing unit 110 can then provide the sound identifications back to the recipient. For example, as shown in FIG. 5, the external device 106 could generate text at display screen 150 identifying the sounds to the recipient. However, in another example, the sound processing unit 110 could generate control signals that cause the generation and delivery of stimulation signals that cause the recipient to hear speech identifying the sounds present in the auditory environment (e.g., "You are hearing a dog barking and a bird chirping.")

In another example, the recipient of cochlear implant 101 may be rehabilitating at home and begins to perceive new sounds as her hearing progresses/improves. For example, she may begin to newly hear/perceive a "humming" sound in her home. As such, in this example the recipient uses the user interface 156 of external device 106 to enter a request for an identification of the sounds in the surrounding environment (e.g., a button press, a touch input at a touchscreen, etc.). In this example, the request entered by the recipient via user interface 156 is a sound identification trigger condition that causes the audio training program to identify the sounds present in the recipient's auditory environment and then provide the recipient with those sound identifications, including an identification of the source "humming" sound (e.g., "You are hearing the humming of a refrigerator.

In yet another example, the recipient of cochlear implant 101 may put some food in a microwave, but she may not perceive the "beep" sound when the food is ready (e.g., the "beep" will sound different to her post-implantation, than the equivalent sound prior to implantation). In such examples, the audio training program could automatically detect the "beep" sound and provide the recipient with an alert message via the external device 106 and/or the cochlear implant 100 informing the recipient that the food is ready (e.g., an audible or visible "Your food is ready" message).

In the above example, the "beep" is a sound identification trigger condition that can be automatically detected by the audio training program through monitoring of the auditory environment for predetermined trigger words, sounds, sound characteristics, etc. In such examples, the recorded sound segments may be streamed continuously to the cloud, with sound identifications likewise being streamed back to the external device 106. The audio program can then automatically trigger the alert message to the recipient.

It is to be appreciated that similar techniques (i.e., continuous streaming to the cloud) may be used to automatically detect other sounds and to trigger automatic sound identifications. For example, the audio training program may be configured to automatically detect and identify other ordinary every day sounds (e.g., 'door closing', 'door opening', 'toilet flushing', etc.) that the recipient has difficult associating with specific events. In the same or other embodiments, the embodiments, the audio training program may be configured to automatically detect and identify certain danger sounds (e.g., smoke/fire alarm, angry dog, etc.), and/or sounds with certain characteristics (e.g., siren of emergency services, such as ambulance, fire, and police), an approaching thunderstorm, a jet aircraft flying in the sky, sound of an ice-cream van/truck, etc.

In accordance with the techniques presented herein, the recipient, clinician, or other user may have the flexibility as to how to use the audio training program. For example, a user may configure the audio training to provide sound identifications automatically based on predetermined criteria and/or to provide sound identifications on demand (e.g., in response to user queries).

In the above examples, the recipient is generally provided with an audible or visible descriptor associated the identity of the sounds within the auditory environment. It is to be appreciated that, in accordance with certain embodiments presented herein, the identity of the sounds may be accompanied by information identifying a location/direction associated with the one or more sounds. In such embodiments, the location information, sometimes referred to as location description, indicates the location(s) of the source(s) of the sounds, relative to the recipient. For example, if multiple microphones are present (e.g., two microphones at the sound processing unit, microphones on both the sound processing unit and the external device, etc.), the audio training program could indicate not just the sound but the direction of the sound. In certain such examples, the information provided to the recipient includes both identity and location information in an audible form (e.g., "A door to your left is opening"). In other such examples, the identity and location information could be provided to the recipient in a visible form (e.g., the user interface 156 displays a "door" symbol/representation, along with an arrow indicating the direction of the opening door). In still other such examples, the identity information could be provided to the recipient in an audible form (e.g., "A door is opening"), while the location information is provided in a visible form (with an arrow at the user interface 156 indicating the direction of the opening door). It is to be appreciated that other techniques for providing the identity and location information could also be used in different embodiments presented herein.

In certain examples, the sound external device 106 and/or the sound processing unit 110 can provide the identifications intermingled with replays of the sound. For example, when providing the recipient with identity information obtained from recorded sound signals, the sound processing unit 110 could generate control signals that cause implantable component 104 to stimulate the recipient in a manner that causes the recipient to perceive: "You are hearing a bubbling brook [replay of recorded bubbling book sound], a dog barking [replay of recorded barking dog sound], and a bird chirping [replay of chirping bird sound]."). Alternatively, the sound external device 106 could generate a sequence of text and/or images that conveys similar information to the recipient.

As noted above, the sound identity information provided to the external device 106, which is then provided to the recipient, includes the sound identity classifications for the one or more sounds present in the recorded sound segments 191. In accordance with certain embodiments presented herein, the sound identity classifications and, more generally, the sound identity information generated by the audio analysis logic 129 and provided to the recipient, can change/adapt over time. That is, the audio training program may implement an adaptive learning process that, over time, increases the amount of identity information provided to the recipient (e.g., the classifications made by the audio analysis logic 129 change over time to adapt the information that can be provided to the recipient).

More specifically, when the recipient's cochlear implant 101 is first activated/switched on, she may have difficulty understanding many sounds. As such, the audio training program may initially only provide the recipient with basic identity information (e.g., "You are hearing a dog barking," "You are hearing a motor vehicle," etc.). However, the ability to discriminate between different sounds (e.g., different breeds of dogs, different accents, different types of vehicular sounds, etc.) can be important for proper sound perception and learning. Therefore, in accordance with certain embodiments presented herein, as the recipient's perception improves the audio training program may adapt, in terms of specificity, the identity information provided to the recipient. Additionally, as the recipient's perception improves, the audio training program may adapt the types or amount of descriptive information provided to the recipient. To facilitate understanding of these embodiments, several examples adaptions that may be implemented by the audio training program are provided below.

In one example, the recipient initially has trouble understanding the sound of a dog barking. As such, the initial identity information provided to the recipient may indicate: "You are hearing a dog barking." Over time, the recipient's perception improves and the audio training program increases the specificity of the information provided to the recipient. In particular, after a first level of adaption, when a dog bark is detected the identity information provided to the recipient may indicate: "You are hearing a large dog barking." As the recipient's perception further improves, the audio training program again increases the specificity of the information provided to the recipient. In particular, after a second level of adaption, when a dog bark is detected the identity information provided to the recipient may indicate: "You are hearing a German shepherd barking."

In another example, the recipient initially has trouble understanding certain speakers. As such, the initial identity information provided to the recipient may indicate: "You are hearing a speaker with a foreign accent." Over time, and after a first level of adaption, when a foreign accent is detected the identity information provided to the recipient may indicate: "You are hearing a speaker with a Chinese accent." As the recipient's perception further improves, the audio training program again increases the specificity of the information provided to the recipient. In particular, after a second level of adaption, when a foreign accent is detected the identity information provided to the recipient may indicate: "You are hearing a child speaking with a Chinese accent."

In another example, the recipient initially has trouble perceiving vehicular noises. As such, the initial identity information provided to the recipient may indicate: "You are hearing a motor vehicle." Over time, and after a first level of adaption, when a motor vehicle is detected the identity information provided to the recipient may indicate: "You are hearing a truck engine." As the recipient's perception further improves, the audio training program again increases the specificity of the information provided to the recipient. In particular, after a second level of adaption, when a foreign accent is detected the identity information provided to the recipient may indicate: "You are hearing a diesel truck engine."

As noted, in general, the adaptions to the sound identity information would occur as the recipient's perception improves. The audio training program may determine when to make the adaptions (e.g., increase the amount of information provided to the recipient) in a number of different manners. In certain examples, the recipient, clinician, or other user may manually initiate the adaption changes. In other examples, the audio training program may initiate the adaptions after certain time periods (e.g., increase the amount of information provided after two weeks with the implant, increase the amount of information provided again after four weeks with the implant, and so). In still other embodiments, the audio training program can monitor the recipient's queries for information (e.g., in terms of the number of queries initiated, the sounds associated with the queries, etc.), and use this information to initiate the adaptions.

FIG. 4, and the above examples, generally illustrate use of the audio training program presented herein for real time rehabilitation. In the real time rehabilitation, the recipient's auditory environment, including the sounds present therein, is analyzed and the recipient is provided with an identification (e.g., audible or visible indication) of the sounds present in the auditory environment. Such real time identification of sounds could improve the rehabilitation journey of a recipient, by allowing them to more quickly perceive and associate sounds in their daily lives. For example, unfamiliar speech or non-speech sounds can be identified by the audio training program, for the benefit of newly implanted recipients who are still learning to recognize and discriminate between otherwise confusing inputs from their environment. The real time rehabilitation techniques (i.e., real time identification of sounds) could also make cochlea implant recipient more independent in their rehabilitation, and potentially more confident in their devices.

As noted above, the audio training techniques presented herein may also include non-real time training aspects. Further details regarding example non-real time training aspects are provided below, again with reference to the arrangement of FIGS. 1-3.

In certain examples, the audio training program is configured to store/log, over time, sounds that are detected in the recipient's auditory environment. The audio training program (e.g., the external device 106, remote computing system 122, etc.) can log sounds in response to the detection of one or more "sound logging" trigger conditions. As used herein, a sound logging trigger condition is a detectable event, condition, or action indicating that at least the identity of the sounds in one or more of the recorded sound segments 191 should be logged to the recipient.

As described further below, sound logging conditions in accordance with embodiments presented herein can take a number of different forms. In certain embodiments, the one or more sound logging trigger conditions may be the same as certain sound identification trigger conditions 495, described above. That is, the sound logging trigger conditions may comprise inputs received from the recipient (e.g., a touch input received via the user interface 156 of the external device 106, a verbal or voice input received from the recipient and detect at the microphone 146 of the external device 106, etc.). In other words, in certain embodiments, the sound logging occurs when the recipient asks the audio training program to identify a sound. It is to be appreciated that these specific sound logging trigger conditions are illustrative.

When a sound logging condition is detected, the audio training program is configured to store the identity of the sounds present in the one or more of the recorded sound segments 191 that are associated with a sound logging condition. As used herein, a recorded sound segment 191 is associated with a sound logging condition when it is received around the same time as a sound logging condition is detected (e.g., immediately prior to the detection of a sound logging condition). Over time, the audio training program generates/populates an "identified sound database" (i.e., the log of the sound identifications/classifications over time).

In the example of FIG. 1, an identified sound database 131 is shown in the remote computing system 122. However, it is to be appreciated that, in accordance with alternative embodiments, the identified sound database may be created at other devices, such as at external device 106.

As noted above, the sound logging may occur when the recipient asks the audio training program to identify sounds (e.g., the sound logging occurs in response to the detection of a recipient-initiated sound identification trigger condition). Therefore, the identified sound database 131 represents the identity of the sounds that the recipient had difficulty understanding/perceiving in auditory environment. Therefore, as the identified sound database 131 is populated, the database may be analyzed to generate a profile of, for example, identified sounds, sound characteristics, sound combinations, etc. that the recipient is repeatedly or continually having trouble perceiving correctly. The identified sounds, sound characteristics, sound combinations, etc. that the recipient is repeatedly or continually having difficult perceiving correctly is collectively and generally referred to as "difficult sound information."

As noted above, the difficult sound information includes the identities of the sounds present in the one or more of the recorded sound segments 191 that are associated with a sound logging condition. In certain embodiments, the difficult sound information may include additional information related to the sounds (i.e., information other than the identities of the sounds). This additional sound information may include the identified sounds (e.g., a recording segment of the sound(s) that triggered the logging), time information (e.g., time stamps) that indicate, for example, a time-of-day (ToD) and/or date when a sound was detected, signal levels, frequency, measures regarding the static and/or dynamic nature of the signals, a classification of the type of sound environment in which the sound was detected (e.g., a "speech," "speech-in-noise," "quiet" environment, etc.).

As described further below, the difficult sound information stored in sound identity database 131 can be used in a number of different manners for rehabilitation of the recipient. In certain embodiments, the difficult sound information can be analyzed and used to suggest changes/adjustments to the operational settings of the cochlear implant 101. In such embodiments, the analysis of the difficult sound information stored in sound identity database 131 can indicate that the recipient is having trouble understanding certain sounds. Therefore, the audio training program can recommend (e.g., to the recipient, caregiver, clinician, etc.) setting changes to the cochlear implant 101 or, in certain examples, automatically institute changes to the settings of cochlear implant 101.

In similar manners, the difficult sound information stored in sound identity database 131 can be used in a clinical setting to make adjustments/changes to the operational settings of the cochlear implant 101. In such embodiments, a clinician may have access to the difficult sound information stored in sound identity database 131 and determine one or more sound perception trends that can be corrected/remediated through setting changes.

In certain embodiments, the difficult sound information stored in sound identity database 131 can be used to generate rehabilitation exercises for the recipient. In such embodiments, the analysis of the difficult sound information stored in sound identity database 131 can indicate that the recipient is having trouble understanding certain sounds. As such, the audio training program may be configured to implement a process in which the cochlear implant 101 delivers a sound (e.g., recorded sound segment) to the recipient, along with a visible or audible identification of the sound (e.g., the delivered sound is preceded or followed by an audible identification of the sound, an image of the sound source is displayed at the external device 106 while the sound is delivered to the recipient, etc.).

The rehabilitation can be static and/or dynamic. In certain arrangements, the system can use the types of queries and/or the frequency of similar queries raised by the user, and some background data gathering, be able to suggest the user to go to a place or venue (e.g., café) to certain experience sound identities (e.g., a person does not know how the sound of an ice-cream van may be instructed to go to a public park). For example, based on a specific query, the system would deliver a recorded sound along with a visible identification to the user. At the same time, the system would save that query and wait to create an opportunity for the user to experience the sound identify in person at a subsequent time. Based on the real time data feeds (e.g., community Whatapps group), the system realizes that there will be/is an ice-cream van showing up at a nearby park for a festival. As such, the system would create a live rehabilitation exercise by recommending the person to go to the park to hear the ice-cream van in reality.

In certain examples, the rehabilitation exercises may be performed "offline," meaning at times that are convenient for the recipient and enable the recipient to more quickly learn to perceive difficult sounds. The recipient of cochlear implant 101 could initiate the rehabilitation exercises, for example, from the user interface 156 of the external device 106.

Although the above examples illustrate the performance of the rehabilitation exercises in response to difficult sound information, it is to be appreciated that the audio training techniques presented herein may also facilitate targeted or real time training. In certain embodiments, a recipient may desire to quickly perceive one or more predetermined sounds. In such examples, the predetermined sounds may be used to trigger real time rehabilitation training (i.e., rehabilitation training that occurs immediately following the detection of the predetermined sounds).

For example, a recipient may want to quickly learn to distinguish the sound of a dog barking from other sounds. Therefore, in such an example, each time that the audio training program detects a dog barking (at least initially), the audio training program can provide an indication to the recipient noting that the sound she just heard was a "dog barking."

Figure 6:
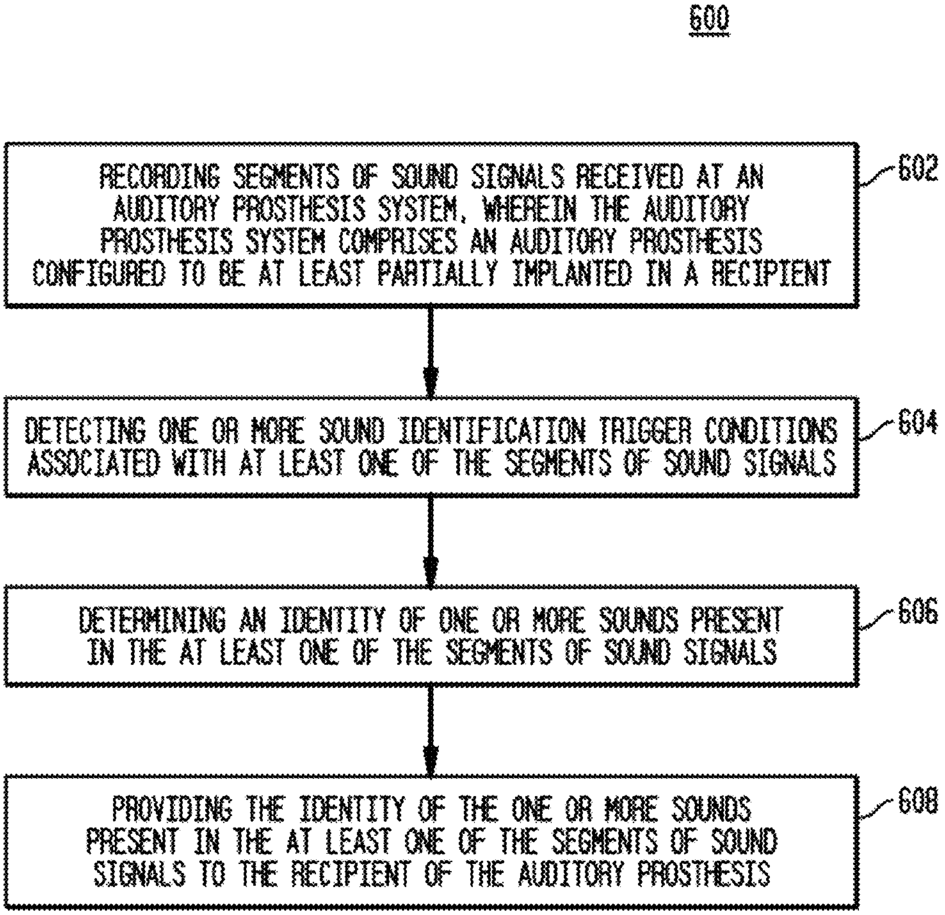
FIG. 6 is a flowchart of a method, in accordance with certain embodiments presented herein.

FIG. 6 is a flowchart of a method 600 in accordance with embodiments presented herein. Method 600 begins at 602 with the recording of segments of sound signals received at an auditory prosthesis system. The auditory prosthesis system comprises an auditory prosthesis configured to be at least partially implanted in a recipient. At 604, one or more sound identification trigger conditions associated with at least one of the segments of sound signals are detected. At 606, identity of one or more sounds present in the at least one of the segments of sound signals is determined. At 608, the identity of the one or more sounds present in the at least one of the segments of sound signals is provided to the recipient of the auditory prosthesis.

Figure 7:
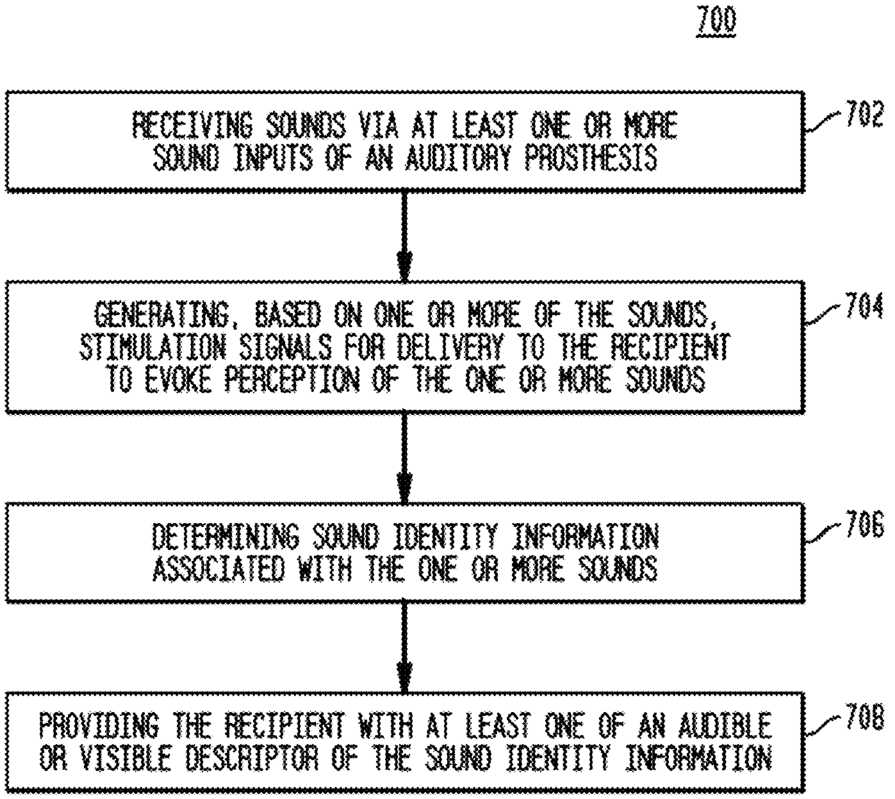
FIG. 7 is a flowchart of another method, in accordance with certain embodiments presented herein.

FIG. 7 is a flowchart of a method 700 in accordance with embodiments presented herein. Method 700 begins at 702 where sounds are received via at least one or more sound inputs of an auditory prosthesis. At 704, one or more of the sounds are used to generate stimulation signals for delivery to the recipient to evoke perception of the one or more sounds. At 706, sound identity information associated with the one or more sounds is determined. At 708, the recipient is provided with at least one of an audible or visible descriptor of the sound identity information.

It is to be appreciated that the embodiments presented herein are not mutually exclusive.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method, comprising:

recording sound signals received at a hearing device system including a hearing device;

detecting one or more sound identification trigger conditions associated with at least one of the sound signals;

extracting sound features from the at least one of the sound signals in response to detecting the one or more sound identification trigger conditions;

performing a classification analysis of the sound features extracted from the at least one of the sound signals to determine an identity of one or more sounds present in the at least one of the sound signals; and providing the identity of the one or more sounds present in the at least one of the sound signals to a user of the hearing device.

2. The method of claim 1, wherein detecting one or more sound identification trigger conditions associated with at least one of the sound signals comprises:

detecting a user-initiated query to identify the one or more sounds present in the at least one of the sound signals.

3. The method of claim 2, wherein detecting a user-initiated query to identify the one or more sounds present in the at least one of the sound signals comprises:

detecting a manual input at a user interface of a component of the hearing device system; or detecting a verbal query issued by the user of the hearing device.

4. The method of claim 1, wherein detecting one or more sound identification trigger conditions associated with at least one of the sound signals comprises:

detecting at least one of a plurality of predetermined trigger sounds.

5. The method of claim 1, further comprising:

receiving contextual data associated with the one or more sounds present in the at least one of the sound signals; and performing the classification analysis based on the sound features extracted from the at least one of the sound signals and the contextual data.

6. The method of claim 5, wherein the contextual data comprises one or more of geographic information, location information, and image data.

7. The method of claim 1, wherein providing the identity of the one or more sounds present in the at least one of the sound signals to a recipient of the hearing device system comprises:

generating a visible descriptor of the identity of the one or more sounds present in the at least one of the sound signals; or delivering the identity of the one or more sounds present in the at least one of the sound signals to the user as an audible descriptor via the hearing device.

8. The method of claim 1, further comprising:

replaying the one or more sounds present in the at least one of the sound signals to the user via the hearing device, wherein the replaying of the one or more sounds is associated with the identity of the one or more sounds.

9. The method of claim 1, further comprising:

providing to the user, with the identity of the one or more sounds, a location description indicating a location of the one or more sounds relative to the user.

10. A method, comprising:

receiving one or more recordings of one or more sounds captured via one or more sound inputs of a hearing device, wherein the one or more sounds include one or more speech components and one or more non-speech components;

extracting sound features of the one or more sounds, including the one or more speech components and the one or more non-speech components, from the one or more recordings;

analyzing the sound features of the one or more sounds extracted from the one or more recordings to determine sound identity information associated with the one or more sounds based at least on the sound features; and providing a user of the hearing device with the sound identity information, wherein the sound identity information comprises a description of the one or more speech components and the one or more non-speech components of the one or more sounds.

11. The method of claim 10, wherein analyzing the sound features of the one or more sounds extracted from the one or more recordings to determine sound identity information associated with the one or more sounds comprises:

generating a description of one or more of a source that produces the one or more sounds, content of the one or more sounds, a type or category of the one or more sounds, characteristics of the one or more sounds, an identity of a speaker associated with the one or more sounds, or speech identity information or non-speech identity information that enables the one or more sounds present in the one or more recordings to be differentiated from other sounds.

12. The method of claim 11, wherein generating a description of the content of the one or more sounds includes generating a description that indicates content of the one or more speech components present in the one or more recordings, and wherein generating a description of the type or category of the one or more sounds includes generating a description that indicates one or more of a type of the source that produces the one or more sounds, a type of noise present in the one or more recordings, a language spoken by the speaker associated with the one or more sounds, or a type of accent of the speaker associated with the one or more sounds.

13. The method of claim 10, wherein analyzing the sound features of the one or more sounds extracted from the one or more recordings to determine sound identity information associated with the one or more sounds comprises:

performing a multi-dimensional classification analysis of the sound features extracted from the one or more recordings of the one or more sounds to classify the one or more sounds into respective categories based on the one or more speech components and the one or more non-speech components; and generating the description of the one or more speech components and the one or more non-speech components of the one or more sounds based on the multi-dimensional classification analysis.

14. The method of claim 13, further comprising:

receiving contextual data associated with the one or more sounds, wherein the contextual data comprises one or more of geographic information, location information, and image data; and performing the multi-dimensional classification analysis to determine the sound identity information based on the sound features extracted from the one or more recordings of the one or more sounds and the contextual data associated with the one or more sounds.

15. The method of claim 10, further comprising:

generating at least one of a visible descriptor or an audible descriptor of the sound identity information of the one or more sounds;

wherein providing the user with the description of the sound identity information comprises at least one of providing the user with the visible descriptor of the sound identity information via an external device associated with the user, or providing the user with the audible descriptor of the sound identity information via the hearing device.

16. A system, comprising:

one or more microphones configured to receive sound signals;

one or more memory devices configured to store instructions for an audio training program; and one or more processors configured to execute the instructions for the audio training program to:

record sound signals received at a hearing device system including a hearing device;

detect one or more sound logging trigger conditions associated with one or more sounds present in at least one of the sound signals;

determine an identity of at least one of the one or more sounds present in the at least one of the sound signals in response to detection of the one or more sound logging trigger conditions; and store at least the identity of the at least one of the one or more sounds in an identified sound database stored on the one or more memory devices.

17. The system of claim 16, wherein to detect one or more sound logging trigger conditions associated with one or more sounds present in at least one of the sound signals, the one or more processors are configured to:

detect a user-initiated query to identify the at least one of the one or more sounds present in the at least one of the sound signals; or detect at least one of a plurality of predetermined trigger sounds.

18. The system of claim 16, wherein to determine an identity of at least one of the one or more sounds present in the at least one of the sound signals in response to detection of the one or more sound logging trigger conditions, the one or more processors are configured to:

extract sound features from the at least one of the sound signals; and perform a classification analysis of the sound features extracted from the at least one of the sound signals to determine the identity of the at least one of the one or more sounds present in the at least one of the sound signals.

19. The system of claim 16, wherein the one or more processors are configured to execute the instructions for the audio training program to:

use at least the identity of the at least one of the one or more sounds stored in the identified sound database for non-real time rehabilitation operations.

20. The system of claim 19, wherein the one or more processors are further configured to execute the instructions for the audio training program to:

determine additional sound information associated with the at least one of the one or more sounds;

store the additional sound information in association with the identity of the at least one of the one or more sounds in the identified sound database; and use the identity of the at least one of the one or more sounds and the additional sound information associated with the at least one of the one or more sounds for the non-real time rehabilitation operations.

21. The system of claim 16, wherein the one or more processors are configured to execute the instructions for the audio training program to:

adjust one or more operational settings of the hearing device based on at least the identity of the at least one of the one or more sounds stored in the identified sound database.

22. The system of claim 21, wherein the one or more processors are further configured to execute the instructions for the audio training program to:

determine additional sound information associated with the at least one of the one or more sounds;

store the additional sound information in association with the identity of the at least one of the one or more sounds in the identified sound database; and adjust one or more operational settings of the hearing device based on the identity of the at least one of the one or more sounds and the additional sound information associated with the at least one of the one or more sounds stored in the identified sound database.

* * * * *